United States Patent
Yi et al.

(10) Patent No.: US 11,159,577 B2
(45) Date of Patent: Oct. 26, 2021

(54) METHOD AND APPARATUS FOR INTERWORKING OF CLOUD PLATFORM AND SECURITY TOOLS

(71) Applicant: ELECTRONICS AND TELECOMMUNICATIONS RESEARCH INSTITUTE, Daejeon (KR)

(72) Inventors: Hyunyi Yi, Daejeon (KR); Sung-Jin Kim, Daejeon (KR); Chulwoo Lee, Daejeon (KR); Woomin Hwang, Daejeon (KR); Byungjoon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 151 days.

(21) Appl. No.: 16/555,026

(22) Filed: Aug. 29, 2019

(65) Prior Publication Data

US 2020/0412769 A1 Dec. 31, 2020

(30) Foreign Application Priority Data

Jun. 28, 2019 (KR) .................. 10-2019-0077954

(51) Int. Cl.
*H04L 29/06* (2006.01)

(52) U.S. Cl.
CPC ........ *H04L 63/205* (2013.01); *H04L 63/0853* (2013.01); *H04L 63/102* (2013.01)

(58) Field of Classification Search
CPC .. H04L 63/205; H04L 63/0853; H04L 63/102
(Continued)

(56) References Cited

U.S. PATENT DOCUMENTS 9,578,063 B1 * 2/2017 Iyer ..................... H04L 63/102
10,333,981 B2 6/2019 Lee et al.
(Continued)

FOREIGN PATENT DOCUMENTS

| KR | 10-1482149 B1 | 1/2015 |
| KR | 10-1482152 B1 | 1/2015 |

(Continued)

OTHER PUBLICATIONS

Zhang et al., "Design, Implementation and Verification of Cloud Architecture for Monitoring a Virtual Machine's Security Health", IEEE Transactions on Computers, vol. 67, No. 6, Jun. 2018, pp. 799-815 (Year: 2018).*

(Continued)

*Primary Examiner* — Khalil Naghdali
(74) *Attorney, Agent, or Firm* — LRK Patent Law Firm

(57) ABSTRACT

A method for interworking of a security tool and a cloud platform includes checking whether there is a record of confirming or applying security related to a target identifier when a cloud platform client calls a platform interface module, determining whether to interwork with the security tool when the record of confirming or applying security related to the target identifier is not present, requesting a resource required for running the security tool to the cloud platform when the security tool is invoked, and obtaining the resource from the cloud platform and storing the same.

15 Claims, 9 Drawing Sheets

(58) Field of Classification Search
USPC .............................................................. 726/1
See application file for complete search history.

(56) References Cited

U.S. PATENT DOCUMENTS

| 2015/0012977 | A1 | 1/2015 | Huh et al. |
| 2018/0027022 | A1 | 1/2018 | Nagaratnam et al. |
| 2020/0050749 | A1* | 2/2020 | Barboi ................ H04L 63/0861 |
| 2020/0052889 | A1* | 2/2020 | Bendersky ............ H04L 9/0822 |

FOREIGN PATENT DOCUMENTS

| KR | 10-2017-0022028 A | 3/2017 |
| KR | 10-1762876 B1 | 7/2017 |

OTHER PUBLICATIONS

Hui et al., "Design ofthe Security Mechanism fora BPO Cloud Computing Platform", 2018 IEEE, pp. 1092-1095 (Year: 2018).*

* cited by examiner

METHOD AND APPARATUS FOR INTERWORKING OF CLOUD PLATFORM AND SECURITY TOOLS

CROSS REFERENCE TO RELATED APPLICATION

This application claims the benefit of Korean Patent Application No. 10-2019-0077954, filed Jun. 28, 2019, which is hereby incorporated by reference in its entirety into this application.

BACKGROUND OF THE INVENTION

1. Technical Field

The present invention relates to a method and apparatus for interworking of a cloud platform and security tools.

2. Description of Related Art

As a cloud-computing environment is increasingly used, design and architecture for fully making use of the advantages of the cloud-computing environment have emerged in order to develop optimized applications. As representative examples of such design and architecture, there are microservices and cloud application architecture. A cloud-native application, based on the mixture of such design and architecture, may be broken down into small and independent units in order to support rapid distribution and flexible scalability. Also, cloud-native applications may interact with each other through a communication protocol such as REST. The cloud-computing environment and these characteristics of cloud-native applications have made it more convenient to develop applications and automate operation, thereby enabling a DevOps environment to be easily constructed. Meanwhile, a docker container technology is one of technologies that enable the rapid deployment and flexible scalability, which are the goal of cloud-native applications. However, due to the more complicated configuration and connection of applications, it is not easy to implement an application in a cloud-native manner and to deploy and manage the same as a single package using only a docker container technology.

SUMMARY OF THE INVENTION

An object of the present invention is to provide a method and apparatus for interworking of a cloud platform and a security tool, which enable the security tool to operate in conjunction with the application deployment automation process of the cloud platform and provide compatibility with the security tool.

Another object of the present invention is to provide a method and apparatus for interworking of a cloud platform and a security tool, which support enhancement of the security of an application deployed in the cloud platform.

The technical objects of the present invention are not limited to the above technical objects, and other technical objects that are not mentioned will be readily understood by a person of ordinary skill in the art from the following description.

A method for interworking of a security tool and a cloud platform according to an embodiment of the present invention may include checking whether there is a record of confirming or applying security related to a target identifier when a cloud platform client calls a platform interface module; determining whether to interwork with the security tool when the record is not present; requesting a resource required for running the security tool to the cloud platform when invoking the security tool; and obtaining the resource from the cloud platform and storing the resource.

In an embodiment, the target identifier may include a container image identifier.

In an embodiment, checking whether there is the record of confirming or applying security related to the target identifier may include determining whether the target identifier is included in a list managed by a result management module.

In an embodiment, the method may further include terminating calling the platform interface module when the record of confirming or applying security is present.

In an embodiment, determining whether to interwork with the security tool may include determining whether to interwork with the security tool according to an interworking decision value in security tool configuration information.

In an embodiment, the method may further include transmitting a response containing failure to confirm/apply security to the cloud platform client when the interworking decision value instructs termination.

In an embodiment, the method may further include assessing a consumed time in the security tool configuration information when the interworking decision value instructs response time assessment; and determining whether to interwork with the security tool according to a result of assessing.

In an embodiment, obtaining the resource from the cloud platform and storing the resource may include receiving a Uniform Resource Locator (URL) and authentication information, which are necessary in order to download a container image corresponding to the target identifier, from the cloud platform; downloading the container image from a container image repository using the URL and the authentication information; and storing the downloaded container image in a shared repository, which is shared with the security tool.

In an embodiment, the method may further include invoking the security tool by providing the obtained resource as input; and receiving a response as a result of interworking with the invoked security tool.

In an embodiment, the method may further include, when the response is security confirmation, transmitting a response containing a security confirmation result to the cloud platform client.

In an embodiment, the method may further include, when the response is security application, distributing output of the security tool to the cloud platform; and transmitting a response containing a security application result to the cloud platform client.

In an embodiment, the method may further include storing the received response.

In an embodiment, when the response is received, a method of processing the result may be determined according to a value of a result-processing method in security tool configuration information.

An apparatus for interworking of a security tool and a cloud platform according to an embodiment of the present invention may include at least one processor; and memory for storing at least one instruction executed by the at least one processor. The at least one instruction may be executed by the at least one processor such that a platform interface module interacts with the cloud platform, such that a security tool interface module interacts with the security tool; and such that a result management module stores a result of invocation of the security tool and provides the stored result in response to a request from the platform interface module.

In an embodiment, the platform interface module may obtain privileges to access a container image repository or a host in the cloud platform and distribute output to the cloud platform, thereby applying a result of interworking with the security tool.

In an embodiment, the security tool interface module may serve to register the security tool to interwork therewith, delete the security tool, and invoke the security tool using configuration information of the registered security tool.

A security profile generation system invoked by a cloud platform security adapter according to an embodiment of the present invention may include a profile generation module for receiving a target image file and an execution command from the cloud platform security adapter, merging a group of candidates for system calls and a list of invoked system calls, generating a custom profile for an application container by adding system calls essential for generating a container to a result of merging, and transmitting the custom profile to the cloud platform security adapter; a dynamic program analysis module for executing the application container in response to the execution command from the profile generation module, logging the system calls invoked by a process executed in the container using a system-call-tracking tool, and transmitting the list of the invoked system calls to the profile generation module; and a binary static analysis module for receiving an executable file of the application container and a shared library from the profile generation module, extracting the group of the candidates for the system calls, and transmitting the group of the candidates for the system calls to the profile generation module. The cloud platform security adapter may interact with a cloud platform through a platform interface module, interact with the security profile generation system through a security tool interface module, store a result of invocation of the security profile generation system in a result management module, and provide the stored result in response to a request from the platform interface module.

In an embodiment, the system calls required for an initial operation of a container engine may be obtained according to information provided by a container platform vendor.

In an embodiment, the system-call-tracking tool may be used for a process when monitoring based on system call tracking is performed.

In an embodiment, the binary static analysis module may extract the group of the candidates for the system calls by detecting a dynamic linking between the executable file in the application container and the shared library, information about procedures that are referred to, and argument values referred to by a system call instruction.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
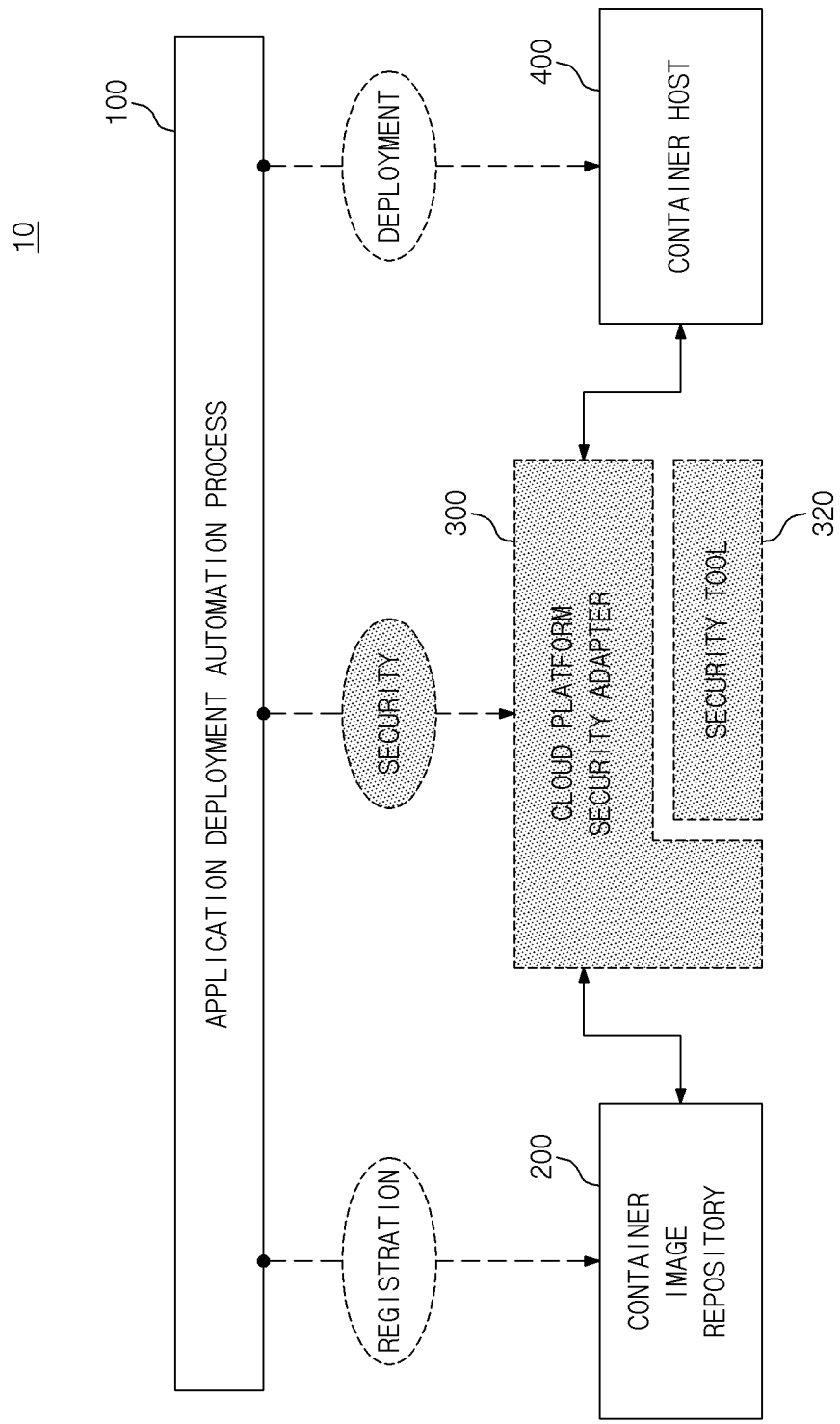
FIG. 1 is an exemplary diagram illustrating a cloud application deployment apparatus according to an embodiment of the present invention.

The present invention will be described in detail below with reference to the accompanying drawings so that those having ordinary knowledge in the technical field to which the present invention pertains can easily practice the present invention.

Because the present invention may be variously changed and may have various embodiments, specific embodiments will be described in detail below with reference to the accompanying drawings. However, it should be understood that those embodiments are not intended to limit the present invention to specific disclosure forms, and that they include all changes, equivalents or modifications included in the spirit and scope of the present invention. It will be understood that, although the terms "first," "second," etc. may be used herein to describe various elements, these elements are not intended to be limited by these terms. These terms are only used to distinguish one element from another element. For example, a first element could be referred to as a second element without departing from the scope of rights of the present invention. Similarly, a second element could also be referred to as a first element. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Also, the terms used herein are merely used to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings in the related art, and are not to be interpreted as having ideal or excessively formal meanings unless they are definitively defined in the present specification.

Generally, Platform-as-a-Service (PaaS) employs container technology, but also includes technology for facilitating deploying and managing cloud-native applications as a single package. PaaS is a cloud service that provides an environment for simplifying implementation and deployment of a cloud-native application and DevOps. That is, PaaS serves to deploy applications in a cloud environment, integrate and provide various tools required for increasing the productivity of development, and automatically manage a wide range of resources, from system resources for running applications to resources such as source code required for developing applications, binaries required for releasing applications, and a runtime environment or bundle. As described above, the cloud platform environment based on a container provides convenience in the development and management of cloud-native applications. However, due to the characteristics of the techniques that are used in order to deploy and execute a container, the cloud platform environment based on a container is more vulnerable to security issues than a cloud platform environment based on a virtual machine.

A container is run based on a specific form referred to as a container image. The container image is a bundle of executables ready to be run. When such a container image is built, various kinds of software, including a root file system, may be installed and configured. The container image is registered in a centralized image repository, thereby being freely shared among multiple users or systems. A user who intends to run a container may bring a container image from a widely known image repository service, such as Docker Hub, and use the same.

These characteristics enable a container image to be easily spread even when the container image is vulnerable to security issues or the container image includes malware. That is, because such a container image is able to be run on a user's host or the host of a container-based platform, the container may compromise the entire host. Also, because containers share the kernel of a host, unlike a virtual machine, the host may be exposed to a serious risk. For example, a container escape may give attackers broader access to the host. Therefore, the owner of a container image is responsible for modifying and updating security vulnerabilities. Particularly, the provider of a cloud platform service that includes a large number of containers must check the images to be deployed in the cloud platform environment. Those involved in cloud services advise developers to apply DevSecOps as a measure for improving the security of a development and management environment.

From a technical aspect, in order to apply DevSecOps to a cloud platform, two methods may be used. First, a security tool may be developed from scratch as the function of a cloud platform itself. Alternatively, security tools developed for container images may be integrated with the cloud platform so as to interwork therewith. However, when considering the efficiency in the development and management of security functions, the second method is more suitable. If there are a method and apparatus that enable various security tools that are not aimed at a container image to also be integrated with the cloud platform so as to interwork therewith, a higher level of security may be quickly provided.

FIG. 1 is an exemplary diagram illustrating a cloud application deployment apparatus 10 according to an embodiment of the present invention. Referring to FIG. 1, the cloud application deployment apparatus 10 may include an application deployment automation process 100, a container image repository 200, a cloud platform security adapter 300, and a container host 400.

In an embodiment, all of the operations of the cloud application deployment apparatus 10 may interwork with the application deployment automation process 100 in the application development/management environment provided by a cloud platform. The application deployment automation process means that deploying an application in a cloud environment proceeds without user intervention in the cloud platform. The cloud platform may perform the application deployment automation process 100. Meanwhile, it should be understood that the entity generating the application deployment automation process 100 is not limited to any specific system or tool.

The cloud platform security adapter 300 may integrate a security step into the application deployment automation process 100, and may interact with a security tool 320. The cloud platform (e.g., PaaS) may use a container as a virtualization environment for an application. Therefore, the target object to be sent and received when a step of the application deployment automation process 100 is performed may be a container image, which is ready to be run as a container.

The container host 400 may receive the application deployed by the application deployment automation process 100 of the cloud platform.

The cloud application deployment apparatus 10 according to an embodiment of the present invention allows only container images having improved security in the cloud platform environment, thereby improving the overall security thereof.

Figure 2:
FIG. 2 is a diagram illustrating an application deployment automation process that is automatically performed in a general cloud platform.

FIG. 2 is a diagram illustrating a general application deployment automation process. Referring to FIG. 2, the general application deployment automation process includes building a container image, registering the container image, and deploying the container image, and building and deploying an application may proceed together at the same time.

Figure 3:
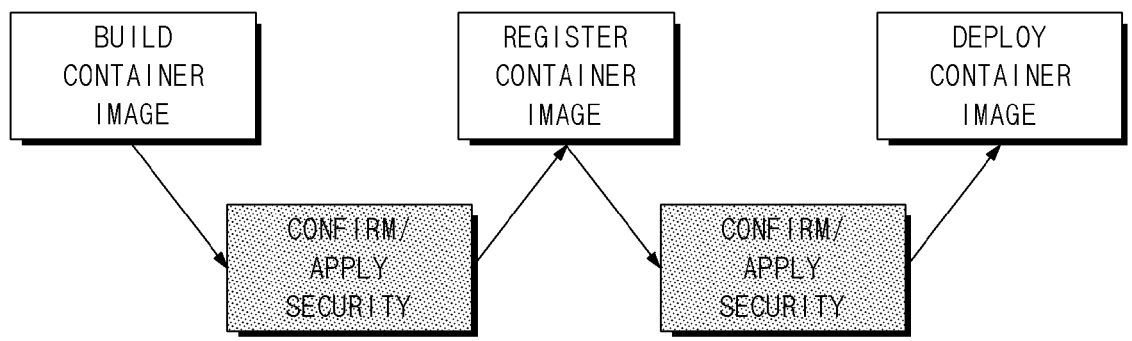
FIG. 3 is a diagram illustrating an application deployment automation process according to an embodiment of the present invention.

FIG. 3 is a diagram illustrating an application deployment automation process according to an embodiment of the present invention. Referring to FIG. 3, the application deployment automation process 100 may separate the process of building and deploying an application into two different processes. Such separation enables the cloud platform to be separately used as an application development environment or an application management environment.

According to an embodiment, the process of building an application is performed only in the development environment. In the management environment, only the process of deploying the application, the stability of which is confirmed through a test conducted in the development environment, may be performed.

As shown in FIG. 3, when a security tool is integrated with the cloud application deployment apparatus 10, the step of confirming/applying security may be added after a container image is built and before the container image is deployed. Specifically, a first security-confirming/applying operation may be performed after a container image is built, and a second security-confirming/applying operation may be performed before the container image is deployed after the registration thereof.

According to an embodiment, each of the first and second security-confirming/applying operations may be determined according to the type of security tool (320 in FIG. 1) connected through the cloud platform security adapter (300 in FIG. 1).

According to an embodiment, when the security tool 320 is a tool for checking vulnerabilities, an anti-virus tool, or the like, an inspection result may be provided, whereby the security of the container image, which is the application that is being developed, may be confirmed.

According to an embodiment, security tools such as a Secure Computing Mode (SECCOMP), Application Armor (AppArmor), and the like may define a filter or rule for controlling the use of host resources or access to the host. These security tools may be used in order to apply security when a container is run.

Figure 4:
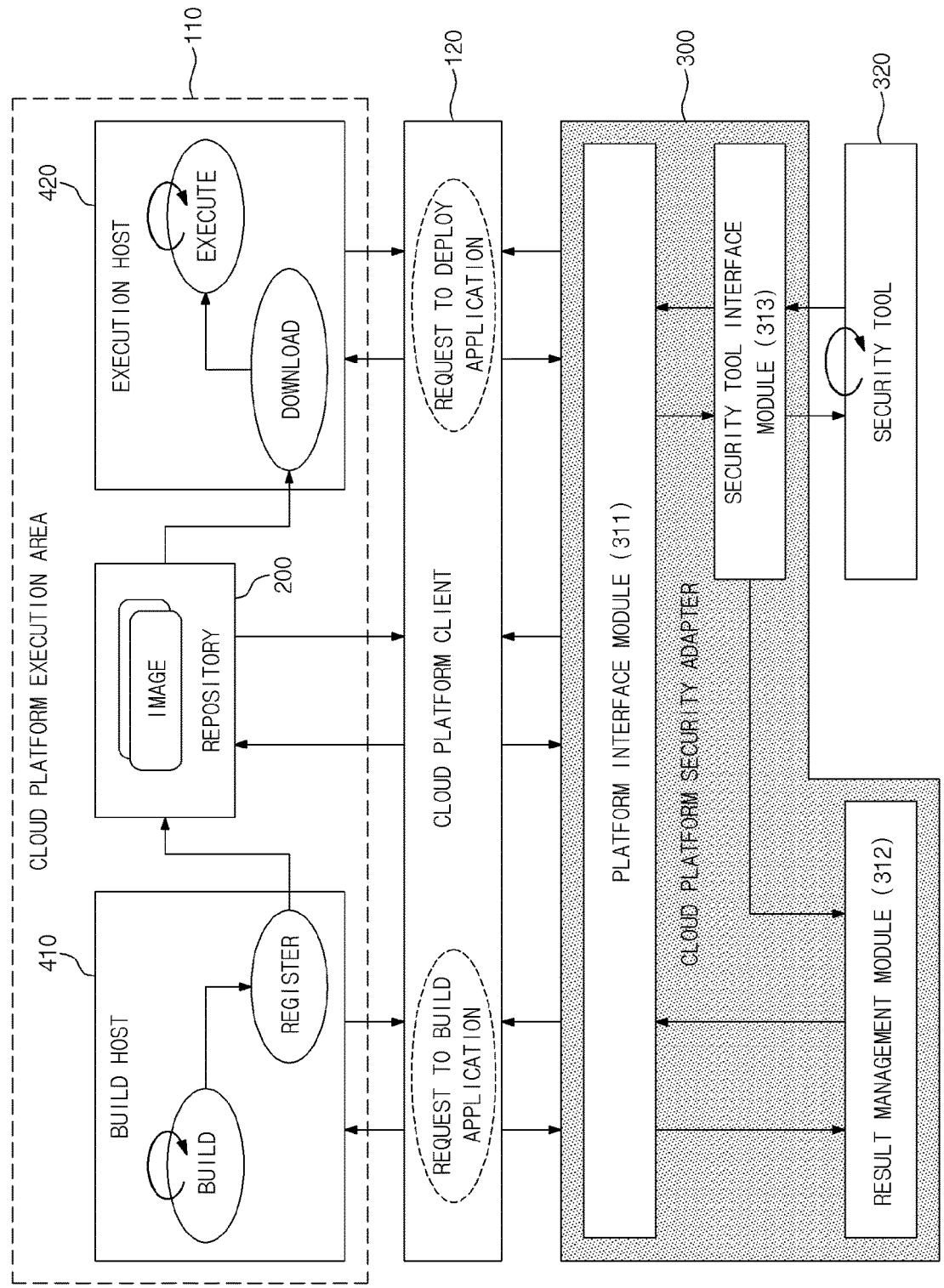
FIG. 4 is an exemplary diagram for explaining a method for interworking with a cloud platform security adapter according to an embodiment of the present invention.

FIG. 4 is an exemplary diagram for explaining a method for interworking with the cloud platform security adapter 300 according to an embodiment of the present invention. Referring to FIG. 4, the cloud platform execution area 110 of an application development/management environment based on a cloud platform and an application deployment automation process 100 performed by a cloud platform client 120 may interwork through the cloud platform security adapter 300.

The cloud platform execution area 110 may be an area in which the components of the cloud platform interact with each other. As shown in FIG. 4, application build and deployment processes may be performed without user intervention in the cloud platform execution area 110.

The cloud platform execution area 110 may include a build host 410, which serves to build and register a container image, a repository 200 for storing registered container images, and an execution host 420, which downloads a container image from the repository 200 and executes the same.

The cloud platform client 120 is a user tool for requesting the application deployment automation process 100 to start an application build or deployment process.

In an embodiment, the cloud platform client 120 may use a tool provided by the cloud application deployment apparatus 10, or may be implemented using APIs exposed by the cloud application deployment apparatus 10. According to an embodiment, the cloud platform client 120 may access the resources managed in the cloud platform execution area 110 using the authentication information of a user or system calling the API.

The cloud platform security adapter 300 is integrated with the cloud platform client 120. Accordingly, the cloud platform security adapter 300 may share privileges to access the resources managed in the cloud platform execution area, the privileges being originally granted to the cloud platform client 120. Also, the cloud platform security adapter 300 may intervene in the application deployment automation process 100, which is performed in the cloud platform execution area 110.

According to an embodiment, the cloud platform security adapter 300 may control the application deployment automation process 100 in such a way that the application deployment automation process 100 is performed according to a response from the cloud platform security adapter 300. However, whether or not the cloud platform security adapter 300 is stopped may be determined by the cloud platform client 120 or according to the configuration of the cloud platform client 120.

When a user requests build of an application through the cloud platform client 120, the build host 410 in the cloud platform execution area 110 is able to build a container image based on input data.

The container image repository 200 may temporarily register the built container image therein, and may then transmit information about the registered container image to the cloud platform client 120. Here, the temporarily registered state means the state in which the registered container image may be deleted according to the result of interworking with the cloud platform security adapter 300.

The cloud platform client 120 may request the platform interface module 311 of the cloud platform security adapter 300 to check whether there is a record of confirming or applying security related to the temporarily container image. The platform interface module 311 may again request a result management module 312 to check whether there is a record of confirming or applying security by transmitting information about the temporarily registered container image thereto. The result management module 312 may retrieve a record of confirming or applying security related to the corresponding container image and respond with the retrieval result. If the response is TRUE, the platform interface module 311 may return a response instructing normal termination to the cloud platform client 120.

When a user requests deploying an application through the cloud platform client 120, the cloud platform client 120 may request the platform interface module 311 of the cloud platform security adapter 300 to check whether there is a record of confirming or applying security related to the container image to be deployed. Here, when the result of retrieval, received from the result management module 312, is TRUE, the platform interface module 311 may return a response instructing normal termination.

The cloud platform client 120 may request the execution host 420 in the cloud platform execution area 110 to deploy an application. The execution host 420 may download the container image from the repository 200, execute the same, and terminate the same.

In response to a request to build or deploy an application, when the response from the result management module 312 of the cloud platform security adapter 300 is FALSE (that is, 'no record') as the result of retrieval of a record of confirming or applying security, the platform interface module 311 may operate differently according to an interworking decision value, which is set when the cloud platform security adapter 300 is integrated.

Figure 5:
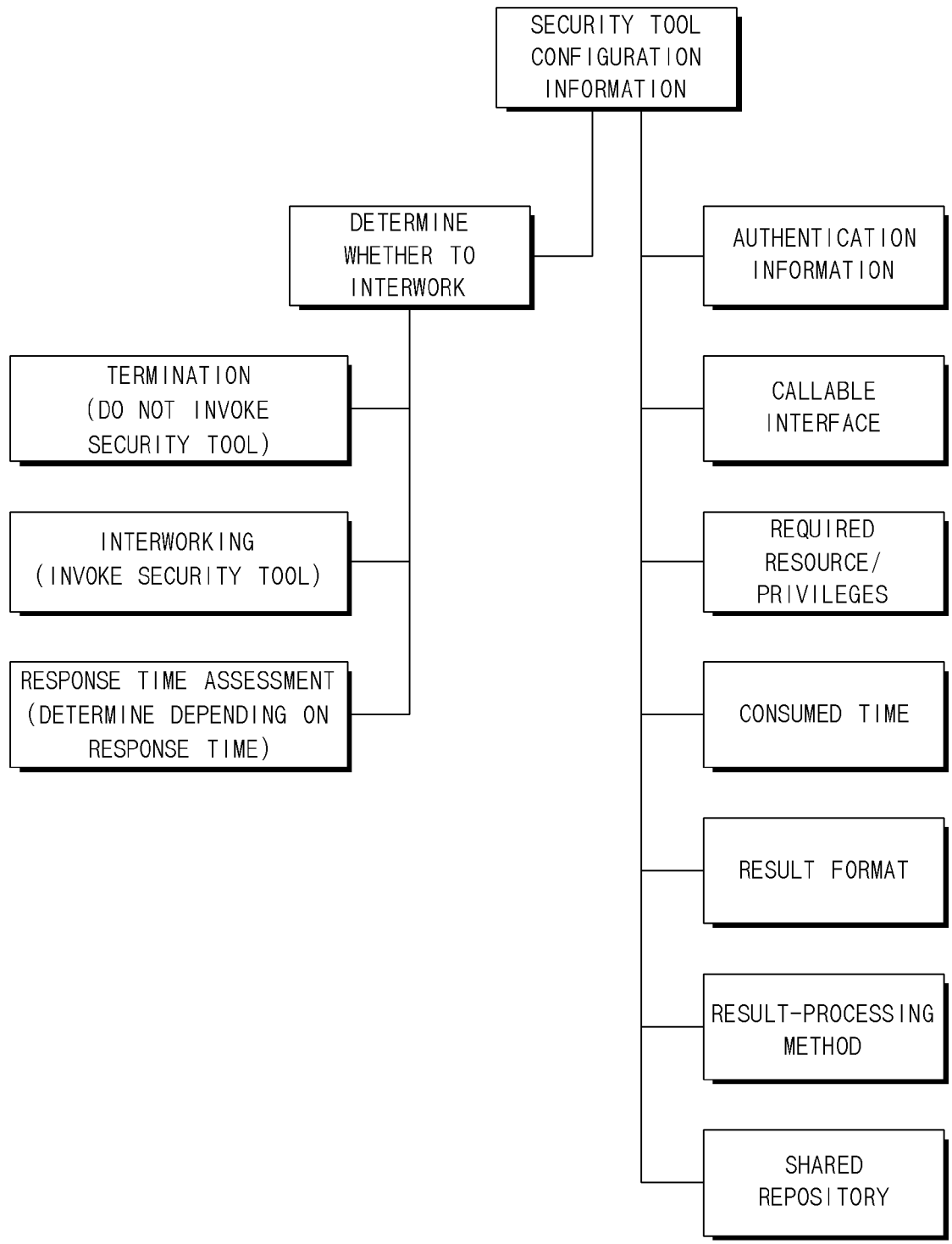
FIG. 5 is an exemplary diagram illustrating security tool configuration information when a cloud platform security adapter is integrated according to an embodiment of the present invention.

FIG. 5 is an exemplary diagram illustrating security tool configuration information when the cloud platform security adapter 300 is integrated according to an embodiment of the present invention. Referring to FIG. 5, the security tool configuration information may include an interworking decision value, a callable interface, authentication information, required resources/privileges, a consumed time, a result format, a result-processing method, a shared repository, and the like.

The callable interface may be a command or an API for invoking a security tool. The authentication information may be authentication information registered in the security tool when the security tool itself controls access thereto. The required resource may be the name of a resource managed by the cloud application deployment apparatus 10, to which access is required when the security tool 320 is run or when the result from the security tool 320 is applied, and the required privileges may be the name of privileges required when the resource is accessed. The consumed time may be the maximum time taken for the task of the security tool 320 to be performed. The consumed time may be referred to when the platform interface module 311 sets a response time assessment in order to determine whether to interwork with the security tool. The result format may be a STDOUT (Standard Output) or a file. The result-processing method may include a value set to 'confirmation' or 'application' and additional information required when 'application' is set. In an embodiment, the value set in the result-processing method may be referred to when the platform interface module 311 applies the result. The shared repository may be set when it is necessary to share information related to invocation of the security tool or the result.

In an embodiment, the platform interface module 311 may operate differently according to the interworking decision value, which is set when the cloud platform security adapter 300 is integrated. For example, the interworking decision value may be indicated any one of 'termination', 'interworking', and 'response time assessment'.

In an embodiment, 'termination' or 'response time assessment' may be set when interworking with a security tool greatly affects the performance of an operating environment. In this case, invoking the security tool may be stopped.

The platform interface module 311 may delete the temporarily registered container image and return 'abnormal termination' to the cloud platform client 120 along with the cause of the abnormal termination. When the interworking decision value is set to 'interworking', the platform interface module 311 may download a container image from the repository 200 in the cloud platform execution area 110 and request the security tool interface module 313 to run the security tool 320. Here, when the current process is for processing an application build request and when the response from the security tool interface module 313 indicates failure of interworking, the platform interface module 311 may delete the temporarily registered container image and return 'abnormal termination' to the cloud platform client 120 along with the cause of the failure.

When the response from the security tool interface module 313 indicates success of interworking, the response may include 'normal termination' and additional information, which is dependent on the type of the security tool 320.

Figure 6:
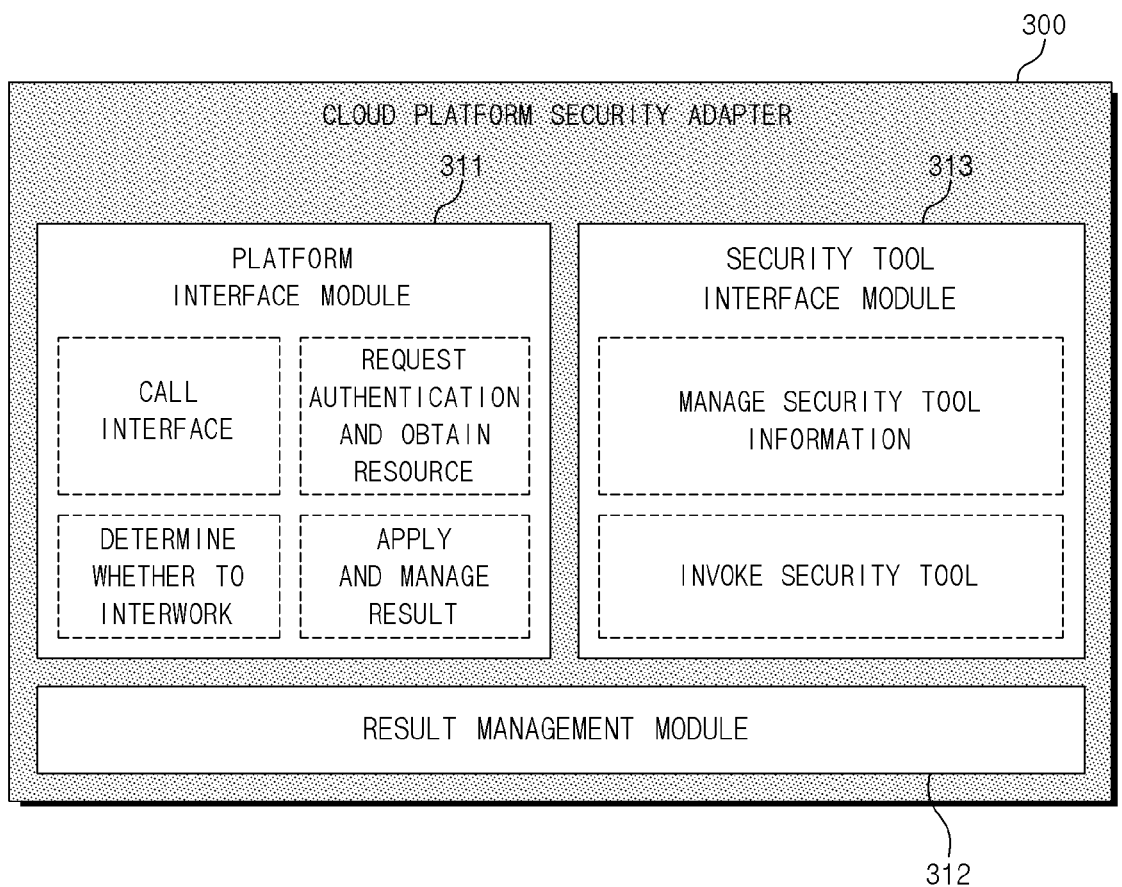
FIG. 6 is an exemplary diagram illustrating a cloud platform security adapter according to an embodiment of the present invention.

FIG. 6 is an exemplary diagram illustrating a cloud platform security adapter 300 according to an embodiment of the present invention. Referring to FIG. 6, the cloud platform security adapter 300 may include a platform interface module 311, a result management module 312, and a security tool interface module 313.

The platform interface module 311 may interact with the application deployment automation process 100. The result management module 312 may store the result of invoking the security tool 320 and provide information stored therein in response to a request from the platform interface module 311. The security tool interface module 313 may interact with the security tool 320.

The platform interface module 311 is an interface with the cloud application deployment apparatus 10, and may expose a callable interface in the form of a UI or API to the outside of the cloud platform security adapter 300. The cloud platform client 120 may interact with the cloud platform security adapter 300 through the platform interface module 311.

The platform interface module 311 may determine whether to interwork with a security tool according to the information that is set when the cloud platform security adapter 300 is installed. Also, in order to obtain a resource required for interworking with the security tool 320, the platform interface module 311 may use the privileges granted to the cloud platform client 120, or may request the authentication of a new user when necessary. For example, when the security tool 320 is invoked, if a container image is required as the input, privileges to access the repository 200 of the cloud application deployment apparatus 10 are required. Here, the required container image may be requested and obtained using the authentication information of the cloud platform client 120.

However, when the authentication information of the cloud platform client 120 does not include privileges to access the repository 200, the platform interface module 311 should authenticate a user or system by itself. In this case, the user or system is registered as a client having privileges to access the cloud application deployment apparatus 10 when the cloud platform security adapter 300 is installed for automation, and the platform interface model 311 itself may manage the authentication information related thereto.

Also, the platform interface module 311 may apply the result of interworking with the security tool according to the information that is set when the cloud platform security adapter 300 is installed. For example, when interworking with a tool such as a security filter is performed, a file in which information to be filtered is defined may be generated after a container image is analyzed. The generated file should be applied when a container is run. Therefore, when invocation of the security tool is completed, this output should be transmitted to the cloud application deployment apparatus 10. Here, the platform interface module 311 may obtain privileges to access the repository 200 or the host 400 of the cloud application deployment apparatus 10 and deploy the output in the cloud application deployment apparatus 10, thereby applying the result of interworking with the security tool.

In this process, the deployment of the output may proceed as follows. The filtering file generated by the security tool 320 may be loaded to the container image. The filtering file may be registered in the repository 200 in the platform execution environment. The registered file is executed in the execution host 420, whereby the filtered file may be dropped to the host.

The result management module 312 may store the result of invocation of the security tool 320 as data, modify or delete the data when necessary, and provide suitable information in response to a request from the platform interface module 311.

The security tool interface module 313, which is the interface with the security tool 320, may register the security tool to interwork with or delete the security tool, and may invoke the security tool 320 using the configuration information of the registered security tool. When the cloud platform security adapter 300 is installed, the security tool interface module 313 may register the configuration information of the security tool 320 to interwork with. Here, the configuration information is as illustrated in FIG. 5.

Figure 7:
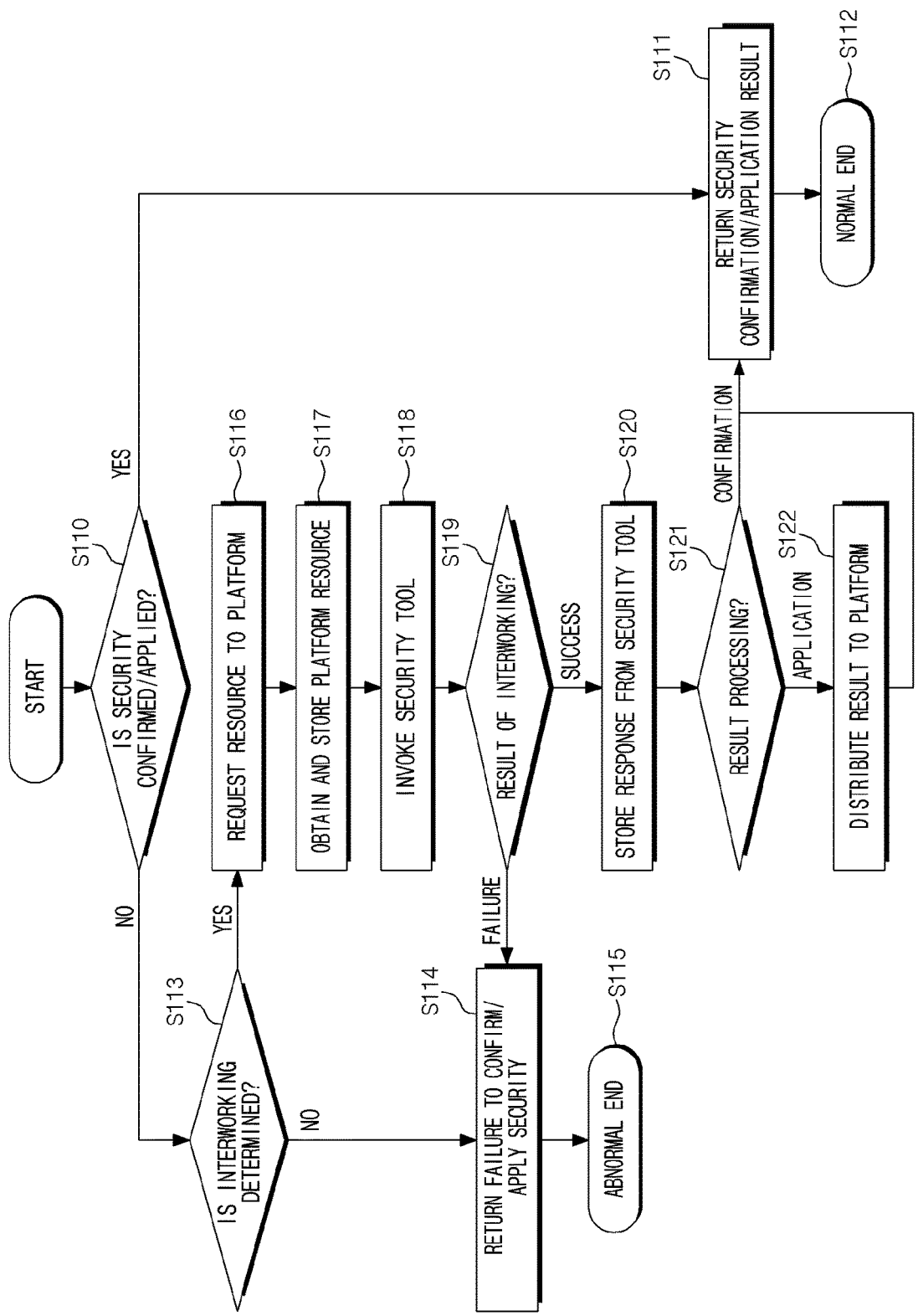
FIG. 7 is a flowchart illustrating the operation of an apparatus for connecting a security tool to a cloud platform according to an embodiment of the present invention.

FIG. 7 is a flowchart illustrating the operation of an apparatus for connecting a security tool to a cloud platform according to an embodiment of the present invention. Referring to FIGS. 1 to 7, the operation of the cloud application deployment apparatus 10 may proceed as follows.

The cloud platform client 120 may call a platform interface module 311. The cloud platform security adapter 300 may check whether there is a record of confirming or applying security related to a received target identifier (the identifier of a container image) at step S110. The checking result may be determined based on the list managed by the result management module 312.

If there is a record of confirming or applying security, a response containing the result may be returned at step S111, and the process may be terminated normally at step S112.

Conversely, if a record of confirming or applying security is not present, whether to interwork with the security tool 320, that is, whether to invoke the security tool 320, may be determined at step S113. Here, whether to interwork with the security tool may be determined according to the interworking decision value in the security tool configuration information, which is set when the cloud platform security adapter 300 is integrated.

Here, when the interworking decision value is determined to be 'termination', a response containing 'failure to confirm/apply security' may be returned at step S114, and the process may be terminated abnormally at step S115. When the interworking decision value is determined to be 'response time assessment', whether to interwork with the security tool is determined by assessing the consumed time included in the security tool configuration information. Then, according to the determination, the process may be terminated, or may proceed by following the execution flow, which is determined based on the interworking decision value.

Also, when the interworking decision value is determined to be 'interworking', a request for a resource may be transmitted to the application deployment automation process 100 at step S116 in order to obtain the resource (container image), which should be delivered when the security tool is invoked. The application deployment automation process 100 may return a method for obtaining the requested resource to the cloud platform security adapter 300.

The cloud platform security adapter 300 may obtain and store the resource based on the returned information at step S117. For example, when a request for a resource is transmitted to the application deployment automation process 100 along with the identifier of a container image, the application deployment automation process 100 may return authentication information and a Uniform Resource Locator (URL), via which the corresponding container image can be downloaded from the repository 200. Then, the cloud platform security adapter 300 may download the container image via the URL and temporarily store the same in the repository shared with the security tool 320.

The cloud platform security adapter 300 may invoke the security tool 320 at step S118 by delivering the obtained resource as the input. Then, the cloud platform security adapter 300 may wait for the result of interworking with the security tool 320. That is, whether the result of interworking is failure or success may be determined at step S119. If the result is failure, step S114 may be performed. That is, a response containing 'failure to confirm/apply security' may be returned, and the process may be terminated abnormally.

Conversely, if the result is success, the cloud platform security adapter 300 may store the response from the security tool at step S120. Then, the cloud platform security adapter 300 may determine how to process the result at step S121. Here, the way to process the result may be determined according to the value of the result-processing method in the security tool configuration information.

If the value of the result-processing method is 'confirmation', a response containing the result may be returned at step S111, and the process may be terminated normally at step S112. If the value of the result-processing method is 'application', the output from the security tool is distributed to the application deployment automation process 100 at step S122, a response containing the result may be returned at step S111, and the process may be terminated normally at step S112.

Figure 8:
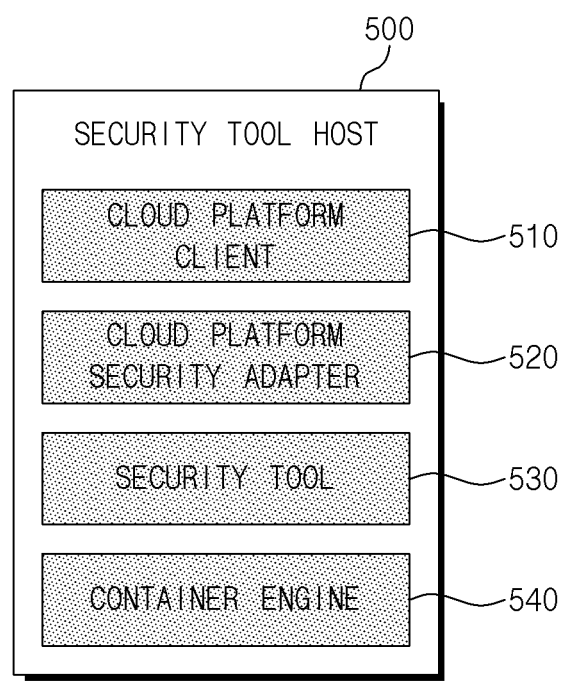
FIG. 8 is an exemplary diagram illustrating a host server for connecting a security tool to an application deployment automation process according to an embodiment of the present invention.

FIG. 8 is an exemplary diagram illustrating a host server 500 for connecting the security tool 320 to the application deployment automation process 100 according to an embodiment of the present invention. Referring to FIG. 8, the host server 500 may include a cloud platform client 510, a cloud platform security adapter 520, a security tool 530, and a container engine 540.

Here, for compatibility with the cloud platform, the components of the host may be configured so as to be the same as those of the container build and execution host in the cloud platform execution area by referring to the version information thereof.

Figure 9:
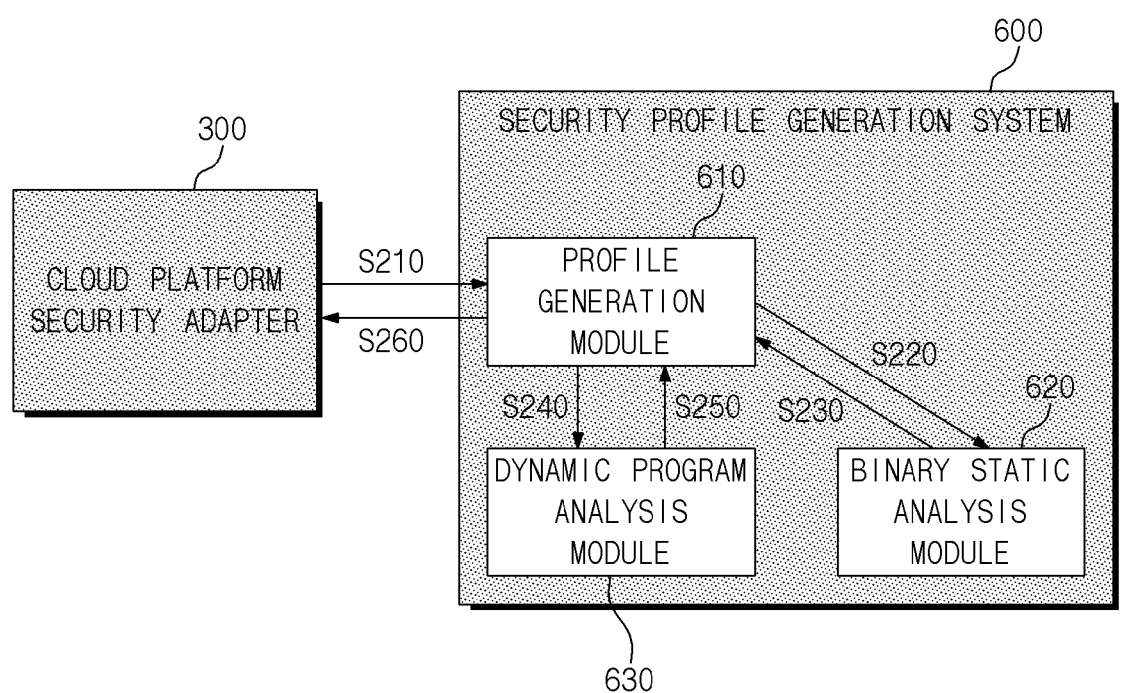
FIG. 9 is an exemplary diagram illustrating a security profile generation system according to an embodiment of the present invention.

FIG. 9 is an exemplary diagram illustrating a security profile generation system 600 according to an embodiment of the present invention. Referring to FIG. 9, the security profile generation system 600 may include a profile generation module 610, a dynamic program analysis module 620, and a binary static analysis module 630. Here, the security profile generation system 600 may be one of the security tools 320 invoked by the security tool interface module 313 of the cloud platform security adapter 300.

The profile generation module 610 may process external input/output and manage the overall operation of the system. The dynamic program analysis module 620 may perform dynamic program analysis for a file generation module and a process running in the container. The binary static analysis module 630 may perform binary static analysis for an executable file in a container and shared libraries.

At step S210, the profile generation module 610 may receive a target image file and an execution command from the cloud platform security adapter 300 and execute the dynamic program analysis module 620.

At step S220, the dynamic program analysis module 620 may run an application container using the received execution command and log the system calls invoked by the process executed in the container using a system-call-tracking tool.

At step S230, the dynamic program analysis module 620 may deliver the list of invoked system calls to the profile generation module 610.

At step S240, the binary static analysis module 630 may receive the executable file in the target container and shared libraries from the profile generation module 610 and extract a group of candidates for system calls, which are expected to be invoked, using an over-approximation method or a call-flow-tracking method.

At step S250, the profile generation module 610 receives the extracted group of candidates for system calls from the binary analysis module 630, merges the received result with the system call list identified through dynamic program analysis, and adds essential system calls required for generating a container, thereby generating a custom profile for the target application container.

At step S260, the profile generation module 610 may deliver the generated custom SECCOMP profile to the cloud platform security adapter 300.

According to an embodiment, the security profile generation tool may receive a target container image and a container execution command as input, and may output a custom SECCOM profile.

According to an embodiment, system calls that are essential for the initial operation of a container engine may be obtained based on information provided by a container platform vendor. For example, 15 system calls, including setpid, setuid, capset, and the like, are essential for generating a container instance in a docker container environment, and on the docker side, the list of the corresponding system calls must be included in the custom security profile.

According to an embodiment, when monitoring based on system call tracking is performed, a tool for tracking system calls invoked by a process may be used. For example, a tool such as strace provided by Linux may be used. The tool may log information about invoked system calls, the arguments thereof, and the return values thereof by monitoring the entire process from the start of execution of an application to the termination thereof.

According to an embodiment, the binary static analysis method may include the process of extracting a group of candidates for system calls expected to be used by an application by detecting the dynamic linking between an executable file in an application container and a shared library, information about a procedure that is referred to, and argument values referred to by a syscall instruction.

Here, binary static analysis methods may include an "over approximation" method, which generates a system call whitelist by analyzing the code area of all external procedures referred to by executable files and shared libraries, and a "call flow tracking" method, which generates a system call whitelist by identifying the code area of explicitly called internal and external procedures by tracking the call flow in a binary and by analyzing the identified code area.

Here, in order to track the code area that is explicitly referred to in the call flow tracking method, identifying the subroutines of a stripped binary and identifying and tracking the destination address of a call or jmp instruction may be additionally performed.

Figure 10:
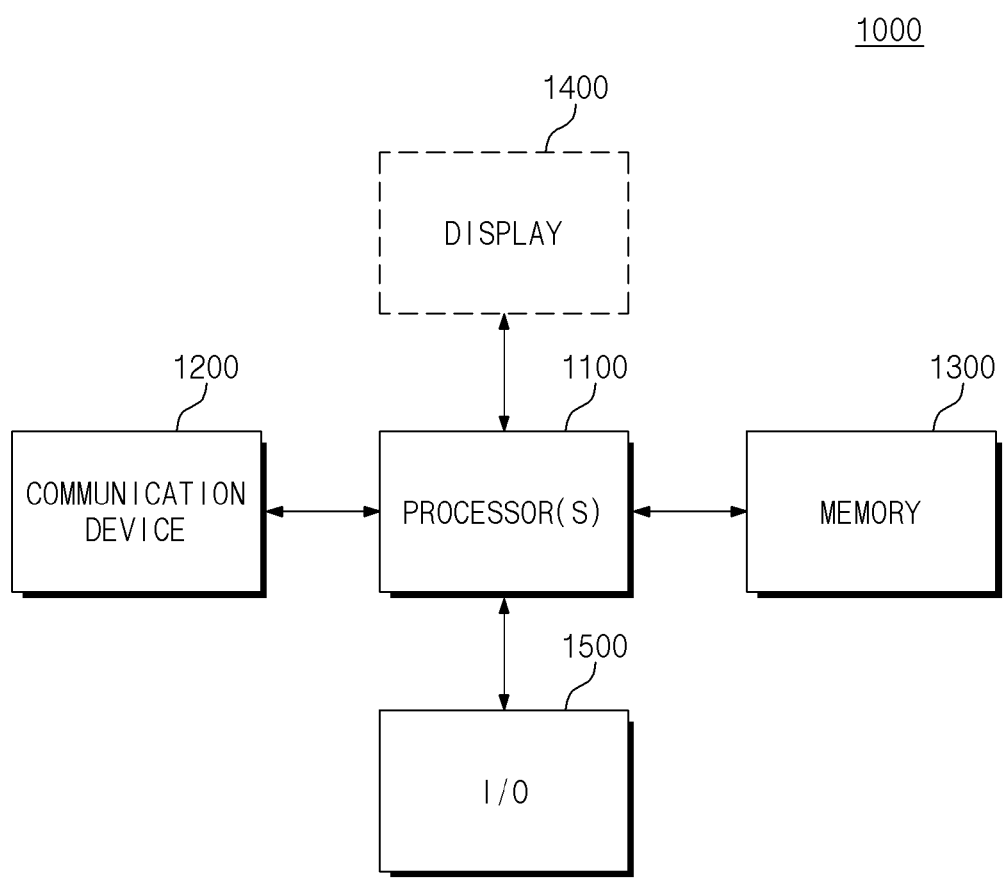
FIG. 10 is an exemplary diagram illustrating a host device according to an embodiment of the present invention.

FIG. 10 is an exemplary diagram illustrating the host device 1000 according to an embodiment of the present invention. Referring to FIG. 10, the host device 1000 may include at least one processor 1100, a network interface 1200, memory 1300, a display 1400, and input/output devices 1500.

The processor 1100 may include at least one of the devices described with reference to FIGS. 1 to 9, or may be implemented using at least one of the methods described with reference to FIGS. 1 to 9. The processor 1100 may execute instructions such that, after a container image is built in response to a request to build an application from a cloud platform client, a first security-confirming/applying operation is performed for the built container image using a security tool, and such that, after the container image is stored in response to a request to deploy the application from the cloud platform client, a second security-confirming/applying operation is performed for the stored container image using the security tool, as described above.

Also, the processor 1100 may execute instructions in order to check whether there is a record of confirming or applying security related to a target identifier when the cloud platform client calls a platform interface module, to determine whether to interwork with a security tool when no record of confirming or applying security related to the target identifier is present, to request a resource required for running the security tool to the cloud platform when the security tool is invoked, and to obtain the resource from the cloud platform and store the same, as described above.

The processor 1100 may run programs and control the host device 1000. The host device 1000 may be connected with an external device (e.g., a personal computer or a network) and may exchange data therewith via the I/O devices 1500. The host device 1000 may be any of various types of electronic systems, including mobile devices such as a mobile phone, a smartphone, a PDA, a tablet PC, a laptop, and the like, computing devices such as a PC, a tablet PC, a netbook, and the like, and electronic devices such as a TV, a smart TV, a security device for gate control, and the like.

The network interface 1200 may be implemented so as to communicate with an external network using any of various wired/wireless methods.

The memory 1300 may store computer-readable instructions. The processor 1100 may perform the above-described operations by executing the instructions stored in the memory 1300. The memory 1300 may be volatile or nonvolatile memory. The memory 1300 may include a storage device in order to store user data. The storage device may be an embedded multimedia card (eMMC), a solid-state drive (SSD), universal flash storage (UFS), or the like. The storage device may include at least one nonvolatile memory device. The nonvolatile memory device may be any one of NAND flash memory, Vertical NAND (VNAND), NOR flash memory, Resistive Random-Access Memory (RRAM), Phase-Change Memory (PRAM), Magnetoresistive Random-Access Memory (MRAM), Ferroelectric Random-Access Memory (FRAM), Spin-Transfer-Torque Random-Access Memory (STT-RAM), and the like.

The embodiments described above may be implemented through hardware components, software components, and/or a combination thereof. For example, the apparatus, method and components described in the embodiments may be implemented using one or more general-purpose computers or special-purpose computers, for example, a processor, a controller, an arithmetic logic unit (ALU), a digital signal processor, a microcomputer, a field-programmable gate array (FPGA), a programmable logic unit (PLU), a microprocessor, or any other device capable of executing instructions and responding thereto. The processing device may run an operating system (OS) and one or more software applications executed on the OS.

Also, the processing device may access, store, manipulate, process and create data in response to execution of the software. For the convenience of description, the processing device is described as a single device, but those having ordinary skill in the art will understand that the processing device may include multiple processing elements and/or multiple forms of processing elements. For example, the processing device may include multiple processors or a single processor and a single controller. Also, other processing configurations such as parallel processors may be available.

The software may include a computer program, code, instructions, or a combination thereof, and may configure a processing device to be operated as desired, or may independently or collectively instruct the processing device to be operated. The software and/or data may be permanently or temporarily embodied in a specific form of machines, components, physical equipment, virtual equipment, computer storage media or devices, or transmitted signal waves in order to be interpreted by a processing device or to provide instructions or data to the processing device. The software may be distributed across computer systems connected with each other via a network, and may be stored or run in a distributed manner. The software and data may be stored in one or more computer-readable storage media.

The method according to the embodiments may be implemented as program instructions executable by various computer devices, and may be recorded in computer-readable storage media. The computer-readable storage media may individually or collectively include program instructions, data files, data structures, and the like. The program instructions recorded in the media may be specially designed and configured for the embodiment, or may be readily available and well known to computer software experts. Examples of the computer-readable storage media include magnetic media such as a hard disk, a floppy disk and a magnetic tape, optical media such as a CD-ROM and a DVD, and magneto-optical media such as a floptical disk, ROM, RAM, flash memory, and the like, that is, a hardware device specially configured for storing and executing program instructions. Examples of the program instructions include not only machine code made by a compiler but also high-level language code executable by a computer using an interpreter or the like. The above-mentioned hardware device may be configured so as to operate as one or more software modules in order to perform the operations of the embodiment, and vice-versa.

According to the configuration of the present invention, there is an advantage in that security may be enforced each time an application is deployed. Also, even if there is no knowledge of the structure of a cloud platform, a security tool may be easily integrated so as to interwork therewith, whereby compatibility with various existing security tools that are not aimed at a container may be provided. The present invention supports various security tools such that they are automatically operated in the cloud platform, thereby improving the security of a cloud environment shared among multiple applications.

The method and apparatus for interworking of a cloud platform and a security tool according to an embodiment of the present invention may enforce security each time an application is deployed.

The method and apparatus for interworking of a cloud platform and a security tool according to an embodiment of the present invention may easily integrate a security tool so as to interwork therewith even if there is no knowledge of the structure of the cloud platform.

The method and apparatus for interworking of a cloud platform and a security tool according to an embodiment of the present invention may provide compatibility with various existing security tools that are not aimed at a container.

The method and apparatus for interworking of a cloud platform and a security tool according to an embodiment of the present invention enable various security tools to be automatically operated in the cloud platform, thereby improving the security of a cloud environment shared among multiple applications.

Meanwhile, the above description is merely specific embodiments for practicing the present invention. The present invention encompasses not only concrete and available means but also the technical spirit corresponding to abstract and conceptual ideas that may be used as future technology.

What is claimed is:

1. A method for interworking of a security tool and a cloud platform, comprising:
   checking whether there is a record of confirmation or application of security related to a target identifier, when a cloud platform client calls a platform interface module of a cloud platform security adapter which interacts with the security tool;
   determining whether to interwork with the security tool, when the record is not present;
   requesting a resource required for running the security tool from the cloud platform;
   obtaining the resource from the cloud platform and storing the resource; and
   when the security tool is registered, invoking the security tool using configuration information of the registered security tool,
   wherein the cloud platform security adapter serves to register or delete the security tool to interwork therewith.

2. The method of claim 1, wherein the target identifier includes a container image identifier.

3. The method of claim 1, wherein the checking whether there is the record of confirmation or application of security related to the target identifier comprises:
   determining whether the target identifier is present in a list managed by a result management module of the cloud platform security adapter.

4. The method of claim 1, further comprising:
   terminating the calling of the platform interface module, when the record of confirmation or application of security related to the target identifier is present.

5. The method of claim 1, wherein the determining whether to interwork with the security tool comprises:
   determining whether to interwork with the security tool according to an interworking decision value in security tool configuration information.

6. The method of claim 5, further comprising:
   transmitting a response containing failure of confirmation or application of security to the cloud platform client, when the interworking decision value indicates termination.

7. The method of claim 5, further comprising:
   assessing a consumed time in the security tool configuration information, when the interworking decision value indicates response time assessment; and
   determining whether to interwork with the security tool according to a result of the assessing.

8. The method of claim 1, wherein the obtaining the resource from the cloud platform and storing the resource comprises:
   receiving a Uniform Resource Locator (URL) and authentication information, which are necessary in order to download a container image corresponding to the target identifier, from the cloud platform;
   downloading the container image from a container image repository using the URL and the authentication information; and
   storing the downloaded container image in a shared repository, which is shared with the security tool.

9. The method of claim 1, further comprising:
   invoking the security tool by providing the obtained resource as an input; and
   receiving a response containing security confirmation or security application as a result of interworking with the invoked security tool.

10. The method of claim 9, further comprising:
    when the response indicates the security confirmation, transmitting the response containing the security confirmation to the cloud platform client.

11. The method of claim 9, further comprising:
    when the response indicates the security application, distributing output of the security tool to the cloud platform; and
    transmitting the response containing the security application to the cloud platform client.

12. The method of claim 9, further comprising:
    storing the response containing security confirmation or security application.

13. The method of claim 12, wherein, when the response is received, a method of processing the result is determined according to a value of a result-processing method in security tool configuration information.

14. An apparatus for interworking of a security tool and a cloud platform, comprising:
    at least one processor; and a memory configured to store at least one instruction executed by the at least one processor, wherein:

the at least one instruction is executed by the at least one processor such that a platform interface module included in a cloud platform security adapter interacts with the cloud platform, such that a security tool interface module included in the cloud platform security adapter interacts with the security tool, and such that a result management module included in the cloud platform security adapter stores a result of invocation of the security tool and provides the stored result in response to a request from the platform interface module, and the security tool interface module serves to register or delete the security tool to interwork therewith, and invoke the security tool using configuration information of the registered security tool.

15. The apparatus of claim 14, wherein the platform interface module obtains privileges to access a container image repository or a host in the cloud platform and distributes output to the cloud platform, thereby applying a result of interworking with the security tool.

* * * * *